United States Patent [19]
Messer

[11] Patent Number: 5,991,740
[45] Date of Patent: Nov. 23, 1999

[54] DATA PROCESSING SYSTEM FOR INTEGRATED TRACKING AND MANAGEMENT OF COMMERCE RELATED ACTIVITIES ON A PUBLIC ACCESS NETWORK

[76] Inventor: Stephen Dale Messer, 626 Millwood Rd., Mt. Kisco, N.Y. 10549

[21] Appl. No.: 08/871,921

[22] Filed: Jun. 10, 1997

[51] Int. Cl.⁶ .............................................. G06F 157/00
[52] U.S. Cl. .......................................................... 705/27
[58] Field of Search .................. 705/26, 27; 395/200.53, 395/200.54, 200.55; 707/501, 513

[56] References Cited

U.S. PATENT DOCUMENTS

| | | | |
|---|---|---|---|
| 5,537,314 | 7/1996 | Kanter | 364/406 |
| 5,692,206 | 11/1997 | Shirley et al. | 395/793 |
| 5,708,780 | 1/1998 | Levergood et al. | 395/200.59 |
| 5,712,979 | 1/1998 | Graber et al. | 395/200 |
| 5,715,315 | 2/1998 | Handelman | 380/49 |
| 5,724,424 | 3/1998 | Gifford | 380/24 |
| 5,848,396 | 12/1998 | Gerace | 705/10 |

OTHER PUBLICATIONS

"Amazon.Com Introduces 'Amazon.Com Associates'—a New Model for Internet–Based Commerce", Business Wire, Jul. 18, 1996.

John A. Quelch, "The Internet and International Marketing", Sloan Management Review, v 37, n 3, pp. 60–75, Spg, 1996.

Linda D. Garcia, "Networking and the Rise of Electronic Commerce", Business Economics, v 30, n 4, pp. 7–14, Oct. 1995.

Bruce Judson, "Luring Advertisers Prospects to the Web", Advertising Age, p. 16, Aug. 7, 1995.

*Primary Examiner*—Frantzy Poinvil
*Attorney, Agent, or Firm*—Hopgood, Calimafde, Kalil & Judlowe LLP

[57] ABSTRACT

A data processing system manages transaction related information generated on a network of interconnected public access computers, including monitoring purchases and providing referral fee accounting based thereon. The integrated software package establishes a platform for Merchants and Site Owners for managing the negotiation of promotional and commercial contracts, the implementation of resulting promotional and commercial efforts, and final accounting in accordance with pre-established criteria. The system thus enables network users to take advantage of a retail sales channel on public or private electronic networks.

15 Claims, 11 Drawing Sheets

MAKE NEW OFFER:
OFFER I.D.
PERCENTAGE (%)
BASE
DURATION
BANNER IMAGE
DESCRIPTION

OFFER TIPE
CURRENCY
APPROVE ALL

SUBMIT | RESET

DATA PROCESSING SYSTEM FOR INTEGRATED TRACKING AND MANAGEMENT OF COMMERCE RELATED ACTIVITIES ON A PUBLIC ACCESS NETWORK

FIELD OF THE INVENTION

The present invention relates in general terms to a data processing system for integrated management of commerce as transacted on a plurality of interconnected computers. More specifically, the present invention relates to a referral tracking and control system for promoting goods and services on a wide area, public/private access network, such as the Internet.

BACKGROUND OF THE INVENTION

In the last four years, there has been an explosion of interest in the transaction of business by interconnected computers linked together in formal networks. The greatest interest is directed to the largest network today, known as the Internet. The Internet is in fact a compilation of smaller linked networks all providing essentially free public access to a wealth of information, stored at individual sites managed by numerous participants on the Internet. The Internet has already changed in dramatic fashion many of the ways people communicate, collect, and share information. More will certainly come, as a greater percentage of our population become comfortable with the machinations required to access and communicate with others on the Internet.

Of particular interest is the World Wide Web, or what is now more often abbreviated as the "web". The web is a collection of interconnected computers forming an important subset of the Internet. Due to its graphic capabilities, the web is fast becoming the focal point of all Internet communications, which are enhanced by the use of hyperlinks (or "links") interconnecting web sites to other sites using a special protocol. This protocol employs a common software structure predicated on the use of the computer code known as hypertext markup language or HTML. A link is created with this form of programming language by having a word in a text field (or a graphic image on a web page) linked to the location of another web page, via a string of information setting forth, at a minimum, the new web page address presented in hypertext transfer protocol (HTTP).

USERS access these web pages with an application program known as a browser; the two most popular are Navigator® by Netscape® Corp. and Explorer® by Microsoft® Corp. By clicking on the highlighted text (or specific graphic image), the USER'S connection to the current web page is transferred to the new web page address associated with the link—with the new page displayed on the screen. This powerful tool permits the USER to "surf the web" by clicking on an almost endless succession of links going to page after page all following a common thread as defined by the text or graphic component of the link label.

For example, if the word unicorn was highlighted on one web page, the USER'S selection of that word would lead to a new page having some connection (strong or weak) to the highlighted concept. A similar link may be created using a graphic image of a unicorn. In either case, the selection of the topic causes the new web page address to be inserted into the browser command line for execution.

One of the greatest promises for the Internet and, in particular, the web, involves its use as a vehicle of commerce. The enhanced communication, rich text, and graphic environment makes the web ideal for supporting a wide variety of transactions, with many of the features of a large collection of separate stores, such as a mall or similar, but with the ability to extensively shop a number of competing chains in an instant. By hopping between competing merchants on the web, the consumer is able to obtain a good price with minimal difficulty, i.e., no hassles for parking, surly store clerks, poor inventory, etc. With the use of secured credit cards or similar, the web consumer has many capabilities that his sidewalk counterpart is lacking.

Notwithstanding these advantages, commerce on the web has been moving at a snail's pace. Much of the problem lies in the sheer volume of information (there are currently over a million sites on the web) and the inability for the various merchants to get out the message on their products and services effectively or efficiently, thus leaving the merchant's corresponding web sites that comprise the critical information largely unknown to the general public. This problem has been exacerbated by the exponential growth in the number of web site pages in existence—all seeking visitors—and, in so doing, diluting the audience.

In an attempt to rectify this problem, there has been a recent effort to expand USER knowledge of various merchant's on the web by use of traditional advertising that is adapted to web strictures. For example, the use of glossy banner ads touting a product or service has now become reasonably common at a number of popular sites. These banners combine graphics and text into an appealing display triggering interest in the USER as they visit the site displaying the banner. By clicking on the banner, the USER is transported by the magic of the web to the Merchant site associated with the banner. This site is the merchant's web page, and provides all the information needed by the USER to partake in the merchant's goods and services. If inclined, after arriving at the merchant's site, the USER may order one or more products from the merchant and pay using an encrypted credit card number. Importantly, the USER would never have located the merchant but for the banner ad, and the merchant would not have booked the nascent sale without the USER'S access to the merchant's web site, via the banner ad. Accordingly, the commerce created by the banner ad or similar promotional based links is of increasing importance in allowing merchants to transact on the Internet.

Notwithstanding this importance, the systems in place to allow the use of referral based electronic commerce are archaic at best. Presently, the use of banners or similar at high traffic points on the web is supported by a fee based system that imprecisely gauges the level of use of the ads by visiting USERS. Typically, the cost for placing a banner is tied to the number of accesses as measured by CPM's (cost per thousand accesses). The merchant is thereafter charged a fee tied to this access level. This, however, fails to measure the much more vital success ratio of those accesses. More importantly, the tracking of accesses is non-standardized and without verification. Lacking these key attributes has retarded the expanded use of promotion based revenues for the content providers, who remain mired in raising revenues through subscription or CPM based approaches that continue to evidence significant consumer resistance. In turn, merchants have been skeptical about conducting commerce on public networks.

It was with the foregoing understanding that the present invention was made.

OBJECTS AND SUMMARY OF THE PRESENT INVENTION

It is an object of the present invention to provide a data processing system for tracking and managing select transactions between a plurality of computer workstations interconnected, via a common network.

It is another object of the present invention to provide a data processing system that tracks the access of one or more links placed on a select location on the web. These links can be either promotional by design or common icons or text that are merely used for interconnection.

It is yet another object of the present invention to provide a data processing system that further tracks the transactions between a merchant and customer that were linked together, via a select promotional link on the web.

It is yet another object of the present invention to provide a data processing system that establishes a central Clearinghouse for online Merchants and site owners to exchange referral offers, receive media planning and other advertising services.

It is yet another object of the present invention to provide a data processing system that monitors transactions and organizes information in a manner that allows for a variety of novel commission, marketing, advertising and servicing arrangements.

It is still another object of the present invention to provide an integrated referral system to support co-branding of select products.

It is another object of the present invention to provide a unified referral arrangement system that permits low cost access, selection and confirmation of a plurality of promotional relationships. This referral system can be based on flat fee access, or percentage of revenue or other.

The above and other objects of the present invention are realized in a specific data processing system designed and configured to operate on one or more servers interconnected, via communication transmission lines to allow data links therebetween. The illustrative embodiment of the present invention includes program controlling logic commands placed on a first server and configured to provide a link to a second server through a Clearinghouse server. The link between the first and second servers is labeled with a reference to a good or service available for purchase on the second server. The second server includes program controlling logic commands directing the server responses to inquiries from USERS interested in purchasing said goods or services, and providing communications to said Clearinghouse server in accordance with any transactions undertaken by the USER.

The Clearinghouse server includes the requisite programming logic to track and report on the level of activity associated with these participants. On a periodic basis, accounting statements are generated for the participants directed to the transactions that have transpired during the defined period.

In accordance with the specific aspects of the present invention, the logic associated with the servers incorporate the use of select tagging of information to permit tracking of web site visitors and for tracking and recording the specific transactions under scrutiny. The identifier includes select coded data and may take the form of a "cookie" (or similar tracking device) that is inserted onto the USER'S hard disk memory during access to the promotional link. Additionally, the Clearinghouse server provides the key platform allowing the Merchants and Site Owner to efficiently reach terms on their joint promotional and commercial efforts, and for each, to internally monitor these external relationships.

The foregoing features of the present invention are more clearly demonstrated by reference to a specific illustrative embodiment thereof described herein in conjunction with the following figures of which:

DETAILED DESCRIPTION OF THE INVENTION

First briefly in overview, the present invention involves the use of a segregated data processing system having a plurality of discrete sites individually programmed to operate in concert to monitor and track transactions between related entities and provide a remuneration to the participants in accordance with a pre-determined set of transaction criteria. The system may be more easily understood by its use in support of transactions on the Internet with the understanding that the foregoing is also broadly applicable in other domains. The Internet is populated with a large number of web sites, each managed and configured to provide information to visitors browsing the web. Some web sites are considered "Content Providers" (or "Site Owners," i.e., those in control of one or more web sites) as they include one or more web pages having information that is of interest to USERS during a browsing session. These Site Owners currently have at least two mechanisms for generating revenues. The first involves the charging of a subscription fee to the visiting USERS somewhat akin to a magazine subscription. This mode of revenue generation is not particularly relevant to the present invention.

The second established method of raising revenue by a Site Owner is to place banner ads on the web pages promoting a third party's goods or services. These promotional banners further include embedded code, creating a link to the sponsoring third party—hereinafter called the "Merchant". USERS that access the banner are transferred to Merchant's web page, via the embedded link and may be presented with the ability to make a purchase directly from the Merchant. The present invention modifies this process and allows a portion of the successful sale made by the Merchant as a credit to the Site Owner. Thus, the Merchant only pays for the promotional efforts that actually result in meaningful benefits.

The second site of interest is the Merchant's server. At the Merchant's server, the specific goods are made available for purchase. This involves the use of secured transactions, via a credit card or other payment vehicle to order the goods with delivery by any one of the available delivery services (land or air). To implement the present invention, programming is installed on the Merchant's server that is capable of tracking the number of visits by USERS that are precipitated by links with banner ads. Alternatively, the USER may be transferred back to the Clearinghouse for completion of the actual purchase transaction.

The final server in this trilogy is the Clearinghouse server. This server is programmed to communicate with the Merchants and Site Owner (many of them simultaneously are expected to be online) to facilitate the tracking and accounting associated with the successful Merchant based transactions. Of perhaps greater importance, this server provides the software that brings the Merchants and Site Owners together into binding promotional arrangements. This coupling of interested parties is done in a low cost almost seamless fashion. It permits the Merchants control over where their ads will appear. It provides the Site Owners input into contract terms. It does all of this with minimal cost and intervention.

Figure 1:
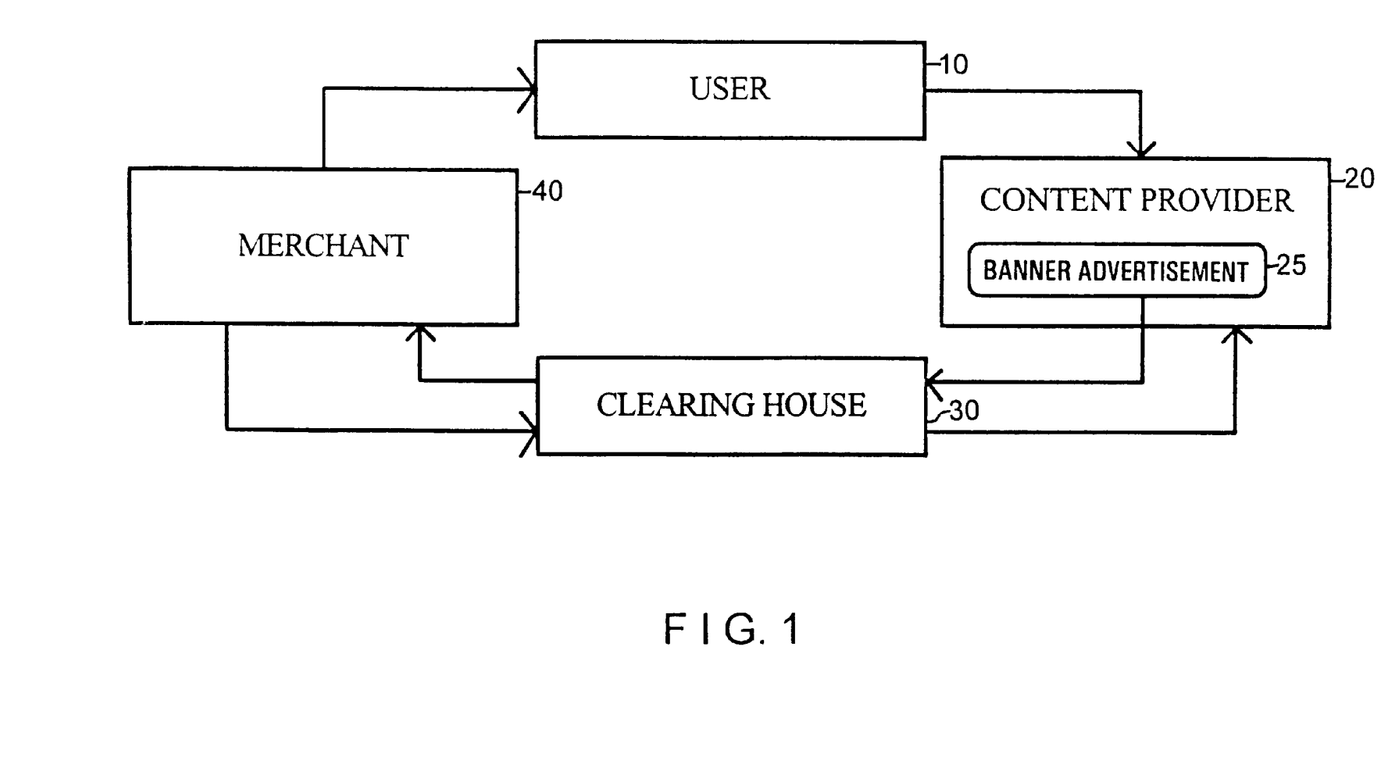
FIG. 1 is a schematic block diagram providing an overview of the system.

In operation and referring to FIG. 1, the USER, block begins the process by visiting a Site Owner block 20, such as one of the main web pages that include articles on current events, business news, sports, personal finance, etc. On this web page, a banner ad (text link or icon) block 25, is displayed to the USER promoting for example sneakers at an attractively discounted price. This banner ad is linked, first in a seamless fashion to the Clearinghouse, block 30. The link then continues directly to the Merchant block 40. During the linking process, the USER has an identifier query string appended to the HTTP entry, and possibly a "cookie" placed on their system. These act as a marker to permit tracking of the USER by the Merchant and Clearinghouse, determine if and when the USER was involved in a purchase, and how to allocate the purchase commission to the Site Owner.

Figure 2:
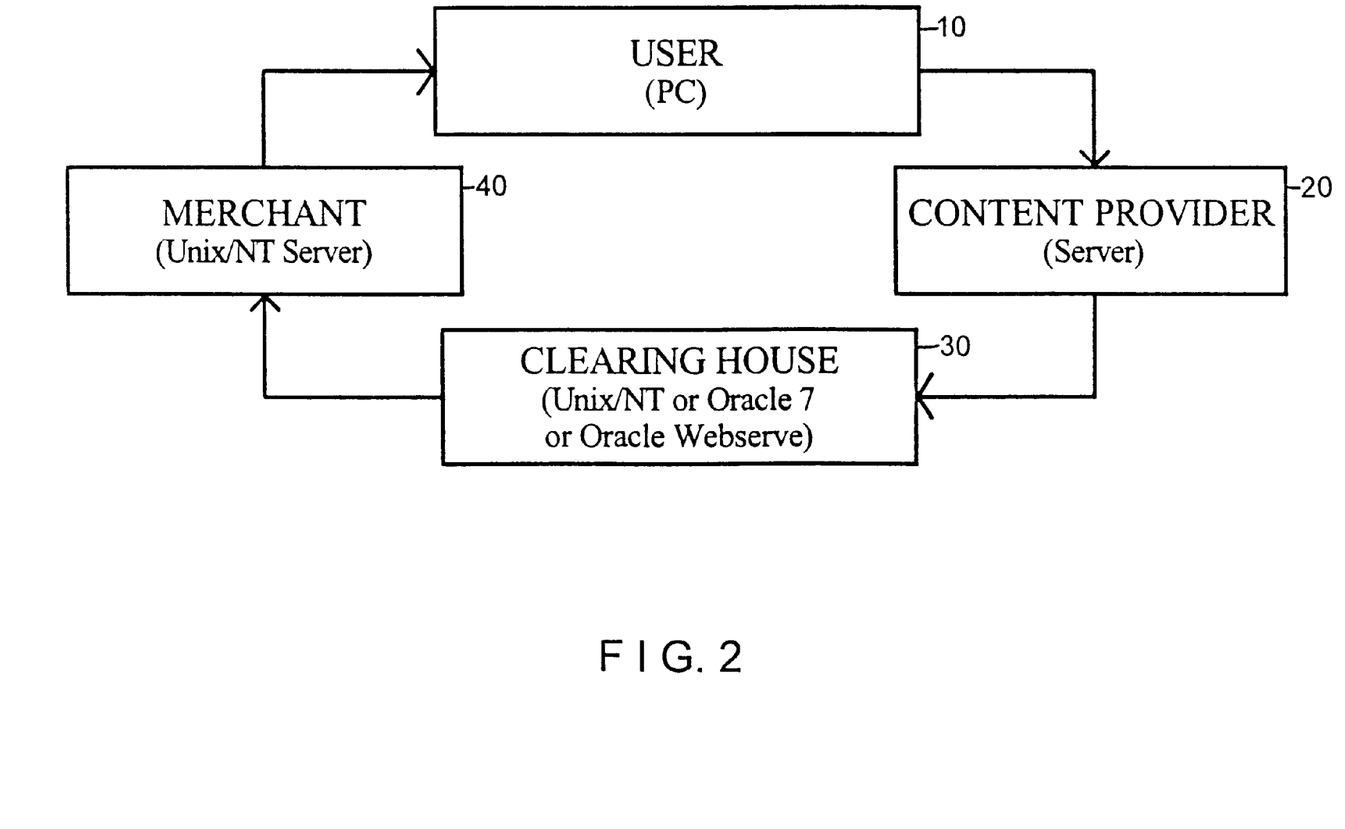
FIG. 2 is a hardware schematic diagram depicting system components and interconnections.

With the foregoing brief overview in mind, attention is now directed to FIG. 2 which provides a hardware diagram of the workstation—server environment implicated by the present invention. Recognizing that the type of hardware and software is selected to conform to the data processing requirements of the system, but is otherwise a matter of choice, it is useful to understand both environments in the context of the present invention. Beginning with the USER 10, the typical USER will access the network, via a modem connection that allows relatively slow transmission rates. USER will include a workstation PC configured with an application program known as a browser to allow address driven access to various web sites in accordance with instructions by the USER.

At block 20, a representative Site Owner is illustrated as a server with access, via various Internet service providers or ISP's that permit entry into the web by the USER. The server at the Site Owner is likely to be a fairly sophisticated computer with multiple lines allowing simultaneous access to many USERS to the stored web pages forming the content of desirable information. Importantly, the Site Owner includes a rich array of interesting subject matter capable of drawing substantial traffic to the server during operation. In addition, the Site Owner has allocated space among the various web pages that can be made available for banner type ads or similar. Finally, it is expected that the Site Owner further provides text based or other promotional vehicles for use in advertising practice. Importantly, the text based promotions use hyperlink protocols and thus operate in the same way as the banner ads. These text links may, in fact, become more prevalent due to their smaller size and direct messaging.

The hub of operation is the Clearinghouse server, 30 linked for interconnection and communication with the network and, in particular, any Merchants and Site Owners interested in formalizing ad programs based on the precepts of the present invention. The Clearinghouse server is equipped with processing power and memory sufficient to meet the demand of multiple subscribers. In its preferred embodiments, the server is configured with either a UNIX operating system or an operating system based on Windows NT. Database management software utilizing Oracle 7 and Oracle webserver is also configured for the specific operating system environment.

Finally, in FIG. 2, the Merchant server 40, is similarly linked to the network, via high speed transmission lines. The Merchant server is also advantageously configured with either the UNIX or NT operating system.

Figure 3:
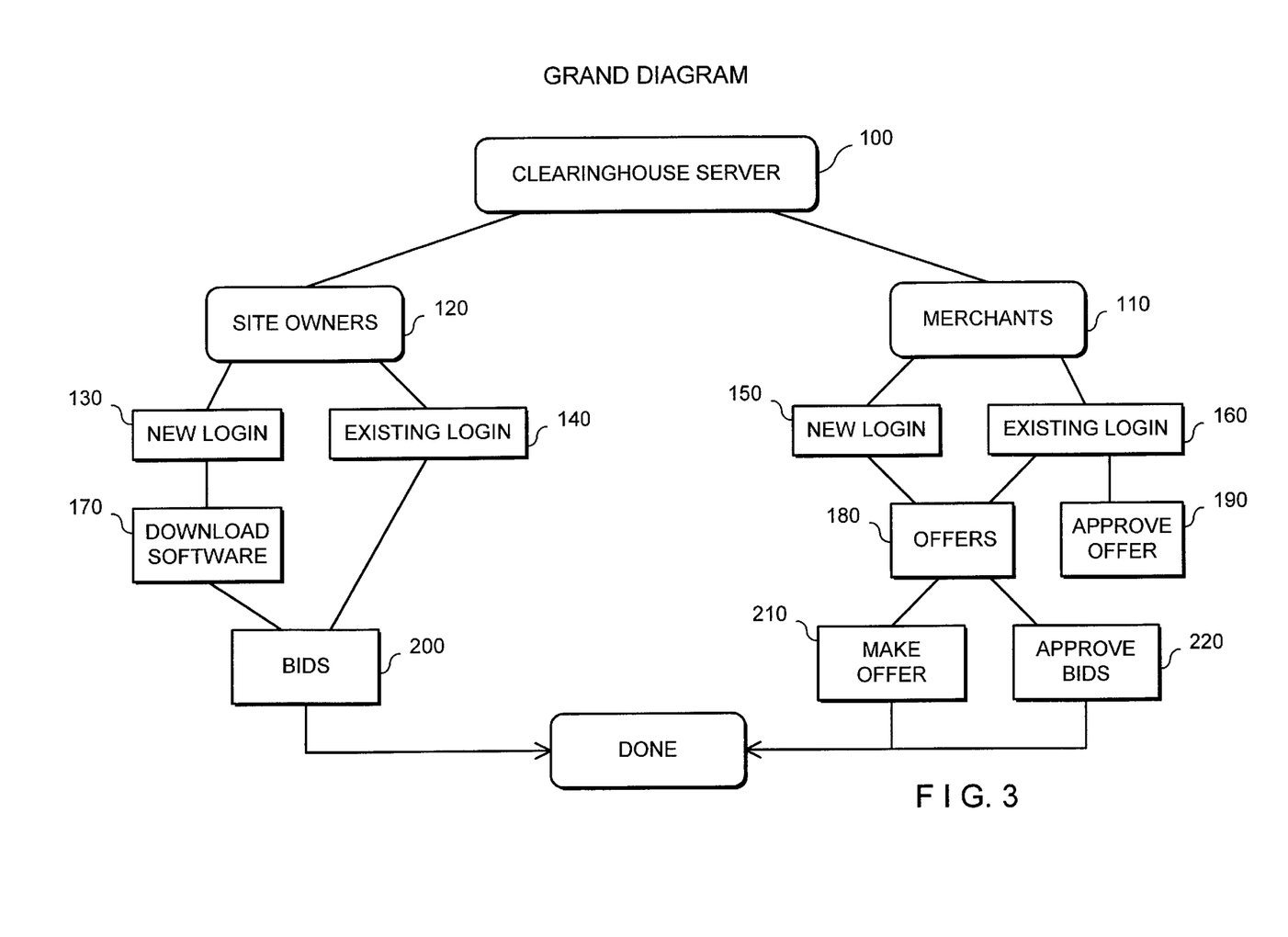
FIG. 3 is an overall logic flow diagram depicting a general system approach.

Turning now to FIG. 3, a high level diagram depicting the overall referral agreement mechanism and strategy is presented in block form. Specifically, the referral arrangement is orchestrated by the Clearinghouse server, 100, bringing together site owners 120 and Merchants 110 into mutually acceptable terms. Importantly, the entire process can be accomplished with a minimal amount of involvement or synchronization between the various entities. In particular, the site owners log-in—new via 130 or existing at 140; download the requisite software, 170 for promotion management on their web site and evaluate the available bids from the Merchants on banner ads or the like, 200.

Similarly, the Merchants also log-in, blocks 150 and 160 and submit offers, 180 in open or closed format. During the session, the Merchant also reviews offers for banners entered by the site owners which can then be approved, 190, make offers, 210 and approve bids, 220.

Figure 4A:
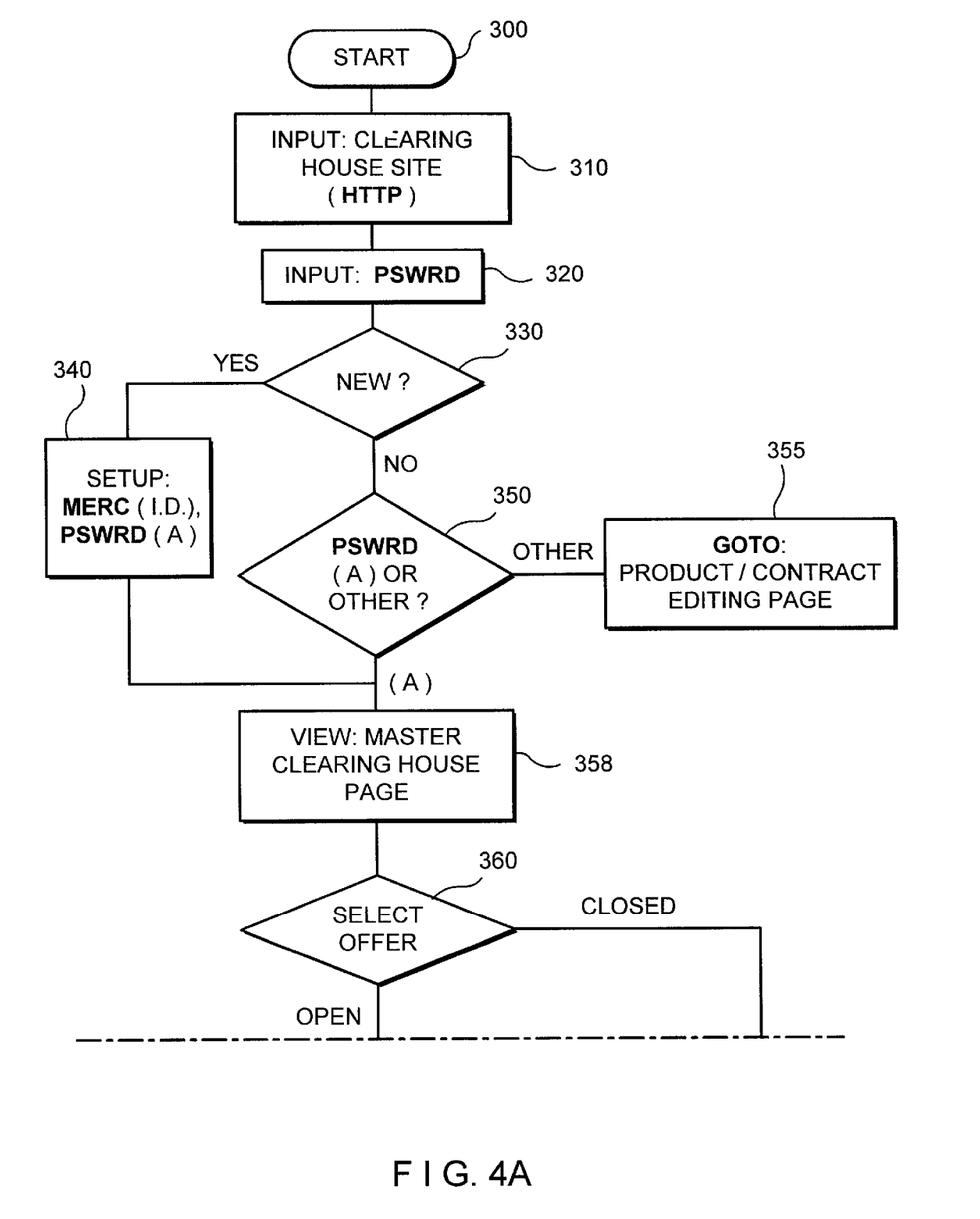
FIG. 4 is a logic diagram depicting the Merchant's access to the system.
Figure 4B:
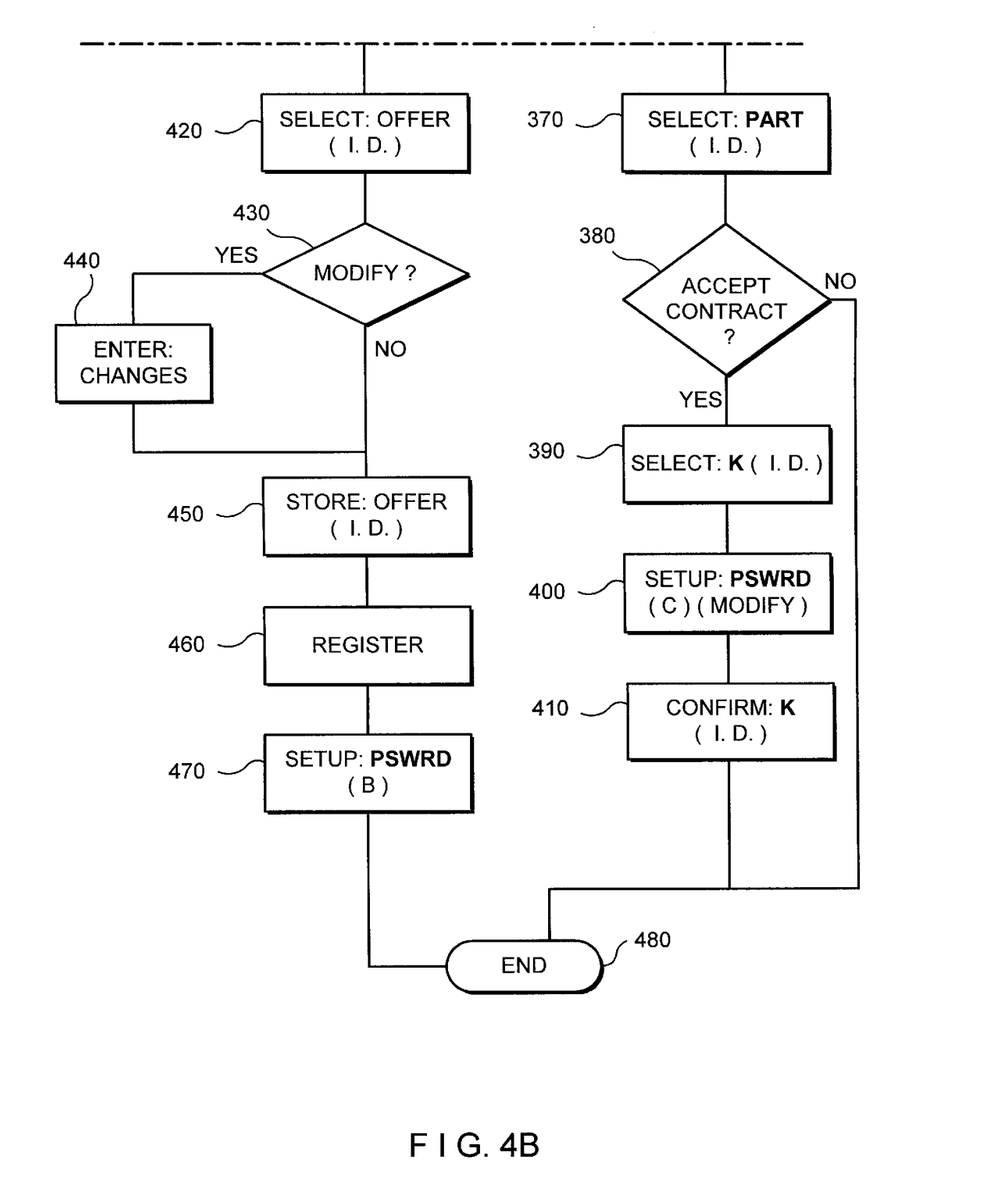

Turning now to FIG. 4, the logic structure for the Merchant access to the Clearinghouse server is depicted in flow chart form. Access begins at block 300 and at, block 310, the Merchants enter the HTTP addressing codes and at block 320 their ID and password. To insure a greater level of security, this ID may have been previously secured, via known confirmation services on the web, such as Verisign®. These services provide registration protocols that enhance accurate communication on the web. More information about Verisign® can be obtained from their web site, located at:

http:\www.verisign.com.

Returning to FIG. 4, the programming logic tests the entered ID, block 330; if new, logic branches to block 340, the Merchant is given a new ID number and registers the selected password. If the Merchant has previously registered, however ("No" to test 320), logic continues to test 350 and entry of the specific password, PSWRD(A). The system then displays a Master Introductory Page, IP(X) which provides at block 360 details on the available packaged promotional programs available relating to Merchant offer type. Typically, the IP display includes segments directed to frequently asked questions, (FAQ), information about the organization or entity supporting and/or operating the Clearinghouse site, and a control panel that makes available to the visitor the various features provided by the Clearinghouse site. In particular, the choices presented include a series of stored packages that comprise a well-tested set of terms relating to the placement of promotion, such as banner ads, textual links or icons, the size and style of such promotions, the commission payment terms, etc. In addition, the Merchant may enter custom terms to describe his promotional needs.

This is accomplished, via test 360. In this illustration, the Merchant selects an offer type, either "open" or "closed."

Open offers are directed to a broad segment of the public, while closed offers delineate a "peer to peer" relationship. The auto-approve process, if selected, indicates that the Merchant offer can be consummated directly by the Site Owner without subsequent evaluation by the Merchant. If the closed offer form is chosen, logic branches to block 370, and the Merchant selects site partners from a list. The contract terms are then entered, via test 380 and blocks 390 to 410. The resulting input form includes the offer ID, commission amount, whether it is auto-approve, the category of goods, banner size, legal terms, any explanations, and valid dates for the offer.

If however, the Merchant selects open at test 360, logic proceeds to block 420, where a series of pre-packaged offer forms are presented for selection; once selected, the various terms are modified, via test 430 and block 440. The resulting open offer is then stored, block 450 and registered, block 460, with associated passwords provided for file access, block 470. The system provides for multiple level access by a Merchant, controlled by different passwords. For example, a marketing person will have a first level access, controlled by a first tier password. This would allow the marketing person to have access to banner graphics and other similar marketing and promotional materials. A merchant administrator, however, would receive a more comprehensive password enabling input and control to a number of features, such as graphic selection, offers, terms, acceptance, commission structures, etc.

In accordance with the above, the principal terms of the open offer are similar to those provided in the closed offer. The key difference is that the open offer is made accessible to all Site Owners, while the closed offer is only available to a select few.

The use of pre-packaged promotional vehicles, setting terms and other specifics creates a powerful promotional vehicle. Merchants and Site Owners will routinely default to a standardized arrangement that is simple to implement, highly flexible, and inexpensive. The selection process of the standard package will be low cost and easily accomplished. Moreover, as the breadth of coverage grows, options such as co-branding will become part of several packages, increasing the overall impact of the promotion. In addition, Merchants will routinely download promotional graphics to the Clearinghouse server, allowing the Site Owners to review the offerings akin to a catalog.

Figure 5A:
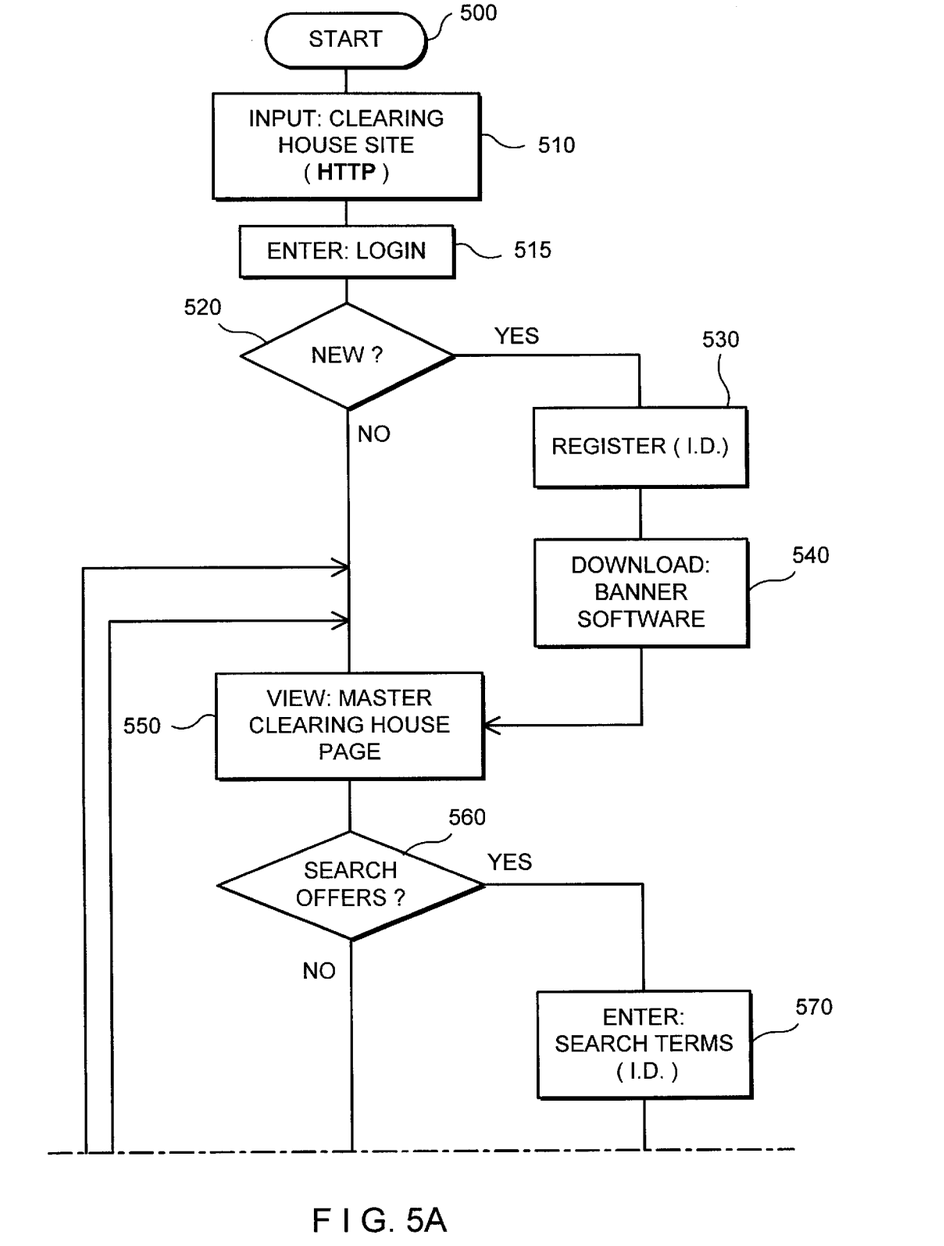
FIG. 5 is a logic diagram depicting the Content Provider's, or site manager's access to the system.
Figure 5B:
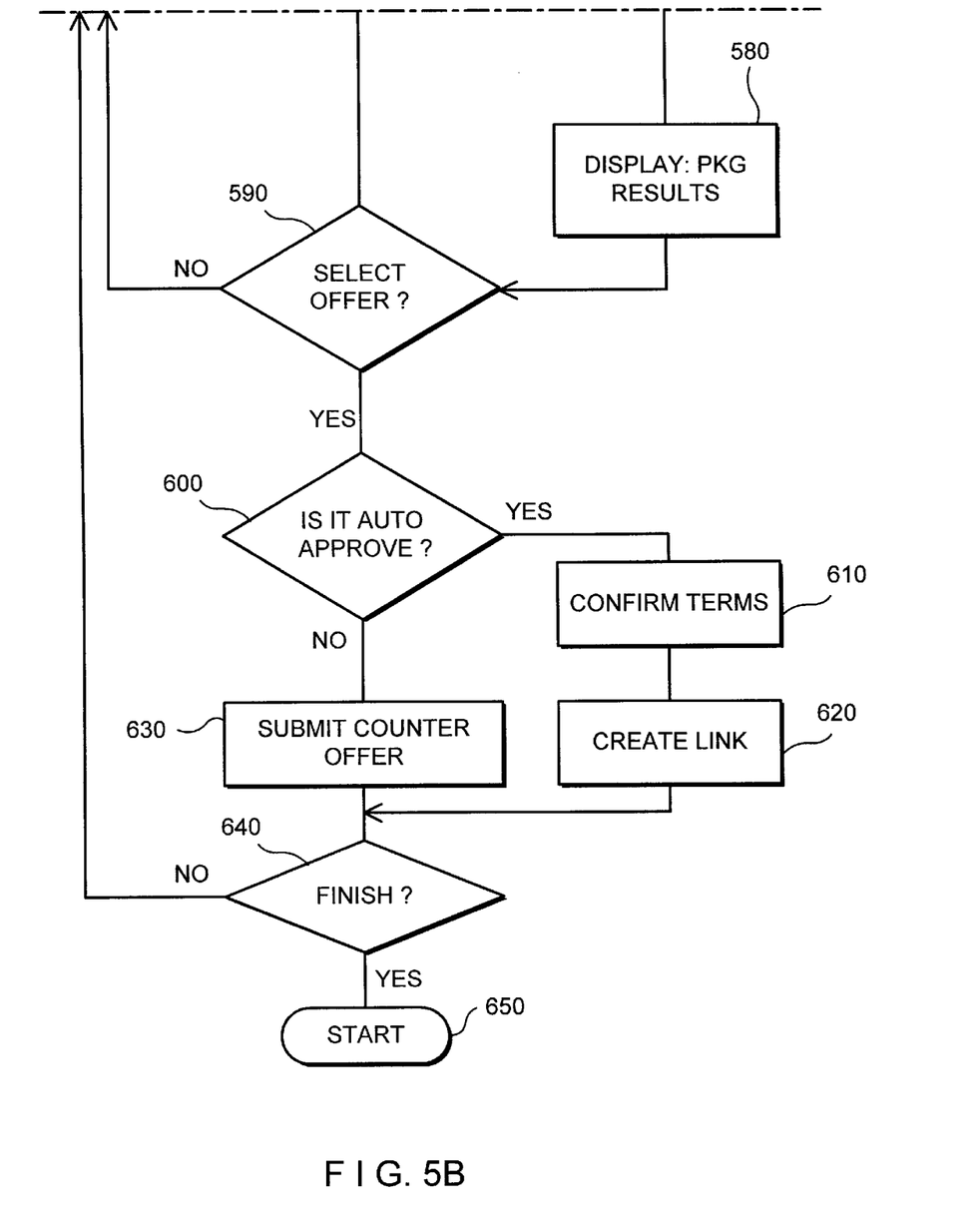

In a manner similar to the Merchant's, and as depicted in FIG. 5, the Site Owner will log-in to the Clearinghouse server, block 500, and at blocks 510–515 enter their respective IDs. At test 520, the system checks for previous registration; if none, the site owner registers at block 530 and receives a download of the system software that becomes resident on that site, block 540.

Once in the system, the site owner is presented with the Master Introductory Page, block 550. At test 560, the site owner decides whether to search available offers residing on the Clearinghouse server. Selection thereof branches logic to block 570 where the search criteria are entered and results displayed, block 580. Upon review of both packaged offers and selected offers from Merchant, the site owner makes a selection, test 590.

Continuing in FIG. 5, test 600 determines whether the selected offer is "auto-approve." Auto-approve merely labels the offer as one capable of being accepted without further input from the Merchant making the offer. Once selected, the contract terms are confirmed, block 610, and the system implements the link, activating the banner ad or relevant text on the Site Owner's server. This may be accomplished with site modification, or pre-package download, of appropriate software. In its simplest form, the site owner can cut and paste the particular code and manually insert it on the relevant page.

If auto-approve has not been activated, the accepted offer is resubmitted back to the Merchant for acceptance, or is modified first (not shown) and resubmitted as a counterproposal, block 630. Once through, the site owner may return to the Master Page, test 640, or end the session, block 650.

In the above arrangement once an offer has been accepted by a Merchant, the Site Owner will receive the coding required to set up the banner ad associated with the Merchant. Assuming a Clearinghouse server name of marketshare.com, the following HTML code presented in Table I is an example of a set up script to install the advertisement banner on the Site Owner site:

TABLE I

```
<!- - Begin Ad - ->
<p align = CENTER>
<A HREF = "/ /ad.marketshare.com/cgi-bin/stats?
site = content.com&merchant = anycompany.com&arg| = r|&arg2 = r2">
<IMG SRC = "/ /ad.marketshare.com/ad/www.content.com/25" WIDTH = 468
HEIGHT = 60 BORDER = O ISMAP></A>
<BR><!- -IMG SRC ="/gif/25" WIDTH = 1 HEIGHT = 1 BORDER = 0- - >
<BR></CENTER>
<!- - EndAd - - >
```

Figure 6A:
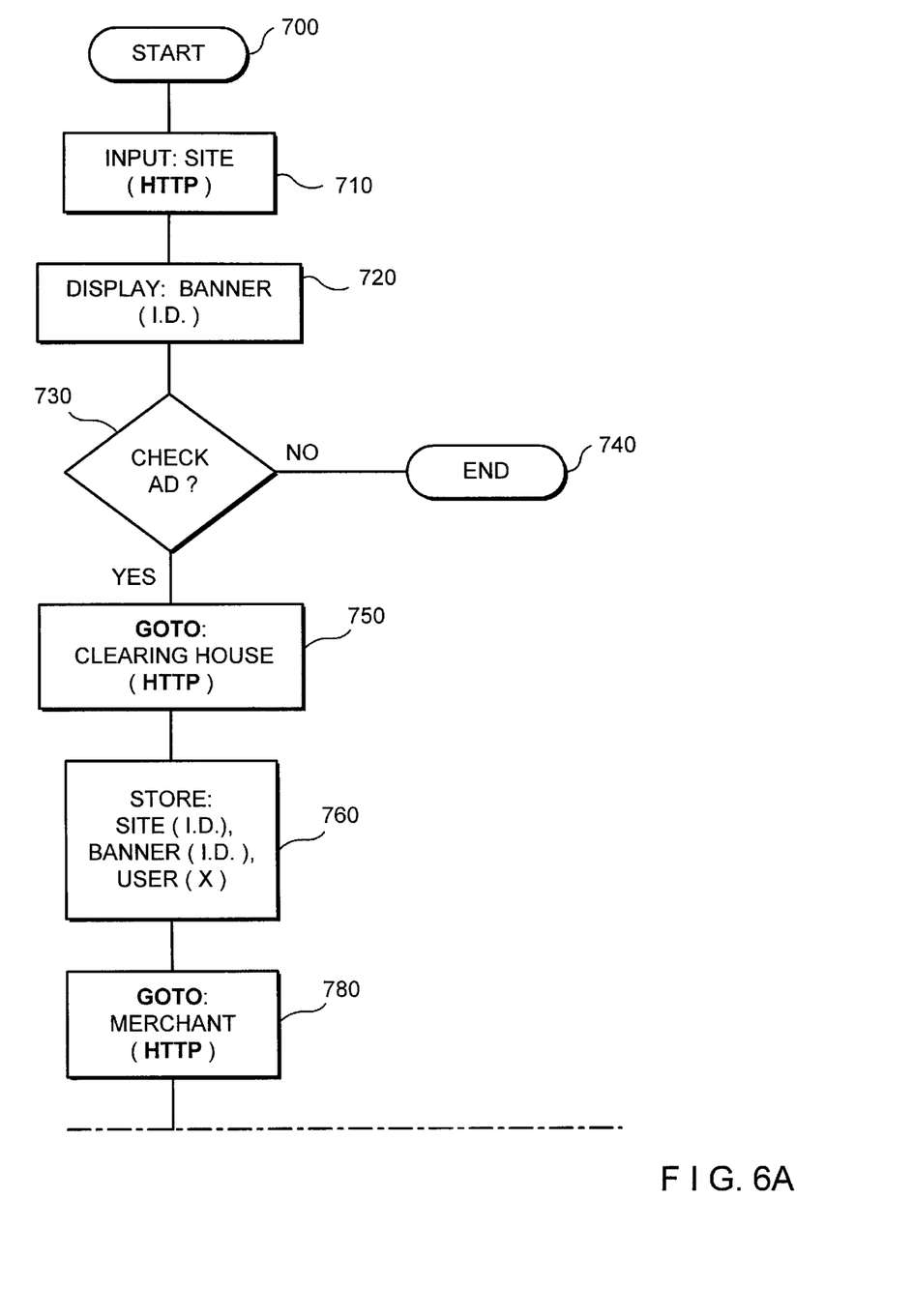
FIG. 6 is a logic diagram depicting the Clearinghouse server's operation.
Figure 6B:
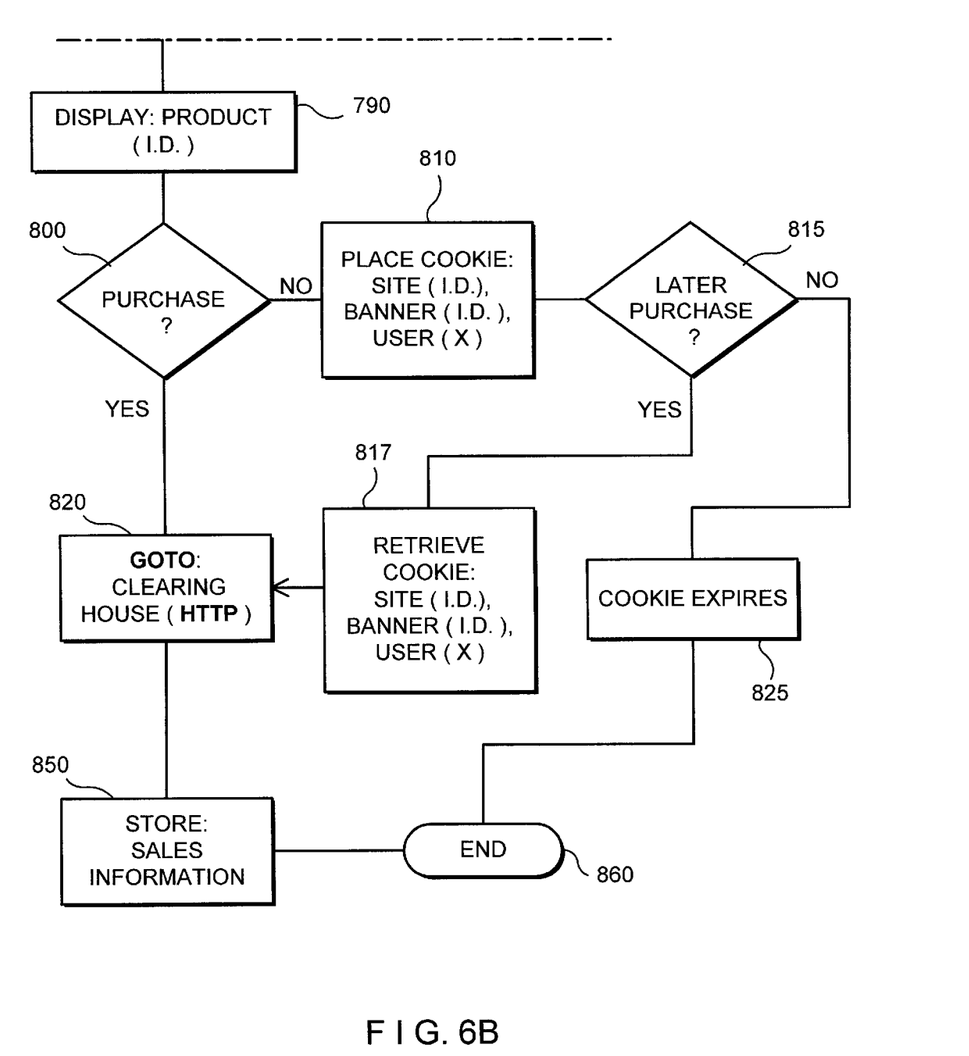

Turning now to FIG. 6, the processing logic associated with USER access is depicted in flow chart form. This process conceptually begins at start block 700 and continues to input block 710 wherein the site location (HTTP) is entered into the USER'S browser linking the USER across the network to the site of the Site Owner. At block 720, the Site Owner has on display banner (ID) for access by the USER.

If the USER fails to access the banner ad ("No" to test 730), processing logically terminates at block 740. If, however, the USER selects the banner ad, the site program inputs onto the USER command line the HTTP address for the Clearinghouse, block 750, and a "query string", i.e., a string of code placed on the HTTP that provides source information. See, for example, line 4, Table I. Accordingly, USER access is directed to the Clearinghouse server, wherein the Clearinghouse server first stores several pieces of information, e.g., site (ID), banner (ID), and USER (X), block 760. Immediately thereafter the Clearinghouse server places onto the USER command line, the address for the Merchant (HTTP) directing USER control to the Merchant's web page, block 780. In accordance therewith, information about the product described in the banner ad is now displayed to the USER including the procedure for purchasing the product, block 790.

The USER is confronted with the option of purchasing the product at test 800. If the USER determines not to make the purchase, logic branches to block 810, and the server places a cookie onto the USER. This cookie enables tracking of a later purchase, test 815 and block 817. If, however, the USER makes the purchase ("Yes" to test 800), information relating to the purchase and the USER are transferred back to the Clearinghouse server, block 820. Sales particulars including all co-promotion and commission payment are then calculated in accordance with stored protocols, block 850.

As discussed previously, after information is received about the purchase at the Clearinghouse server, a commission determination is calculated. The commission will be a factor of several variables including the original arrangement worked out between the Merchant and the Site Owner, and the qualification of the USER in terms of access to the Merchant site, i.e., whether that USER had been directed to the Merchant site by more than one banner ad before the purchase was made. If so, a sharing or priority plan may be required. Once these terms have been implemented, final accounting for the Merchant and Site Owner is implemented including payment of commission and recording all transaction details. In this way, valuable records detailing the activity of select banners in terms of revenue are created allowing for accurate assessment of promotional impact.

Figure 7:
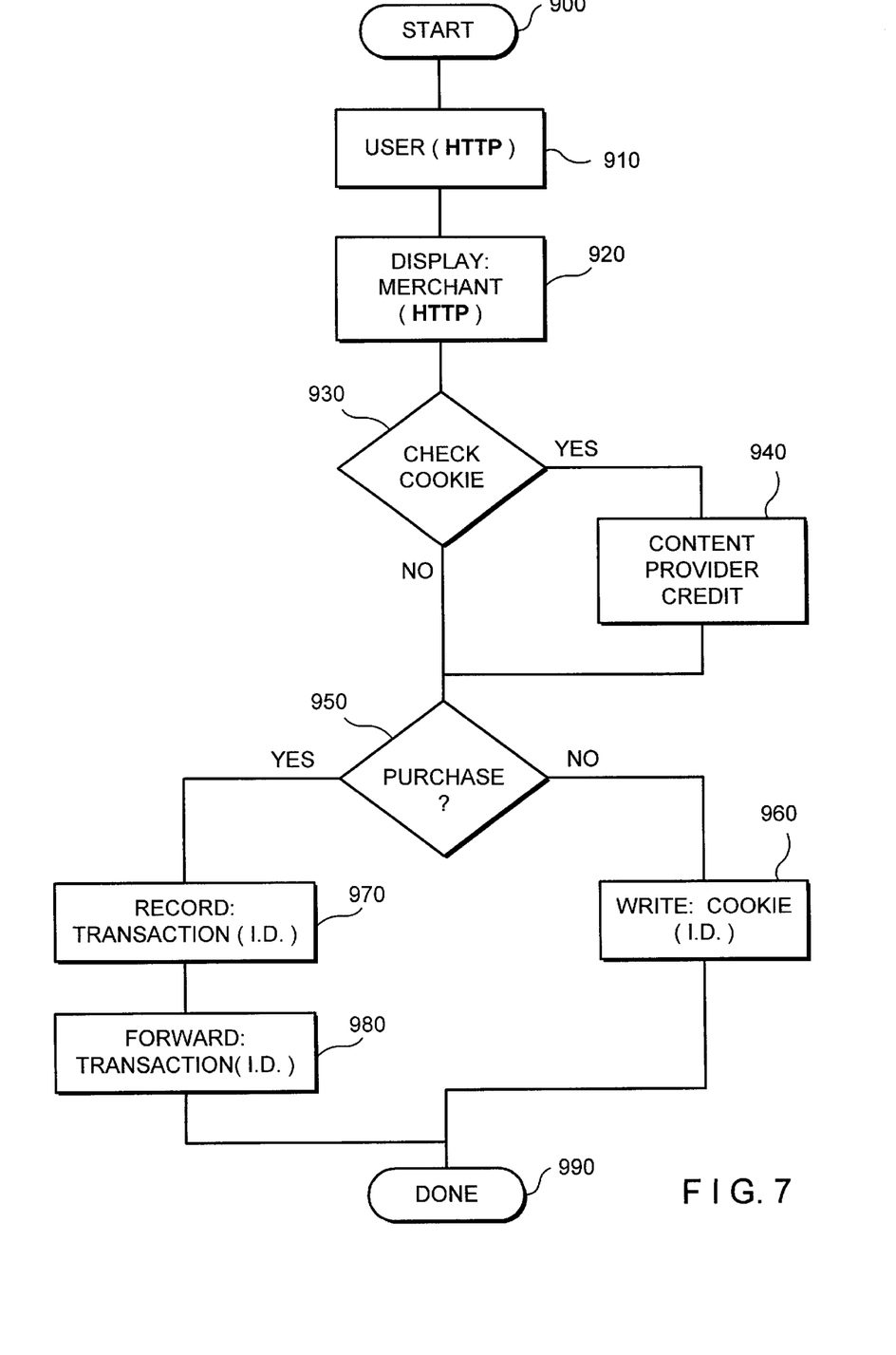
FIG. 7 is a logic diagram depicting Merchant server processing.

In FIG. 7, a logic flow chart describes the Merchant server operation. Logic conceptually begins at block 900, with entry into the server by a USER, via HTTP command, block 910. The Merchant's display screen is presented at block 920. At test 930, the server determines whether the USER arrived with an unexpired cookie or similar device; a positive response branches logic to block 940 and the system stores a "credit" for the last referral site on the cookie or similar device. Logic continues to test 950 wherein a purchase decision is tracked.

A purchase results in a specific system recording the transaction, block 970 and the forwarding of the transaction details to the Clearinghouse server, block 980. If, however, no purchase is made, the system records this on a cookie or similar device deposited with the USER, block 960. Processing is completed at block 990.

Figure 8:
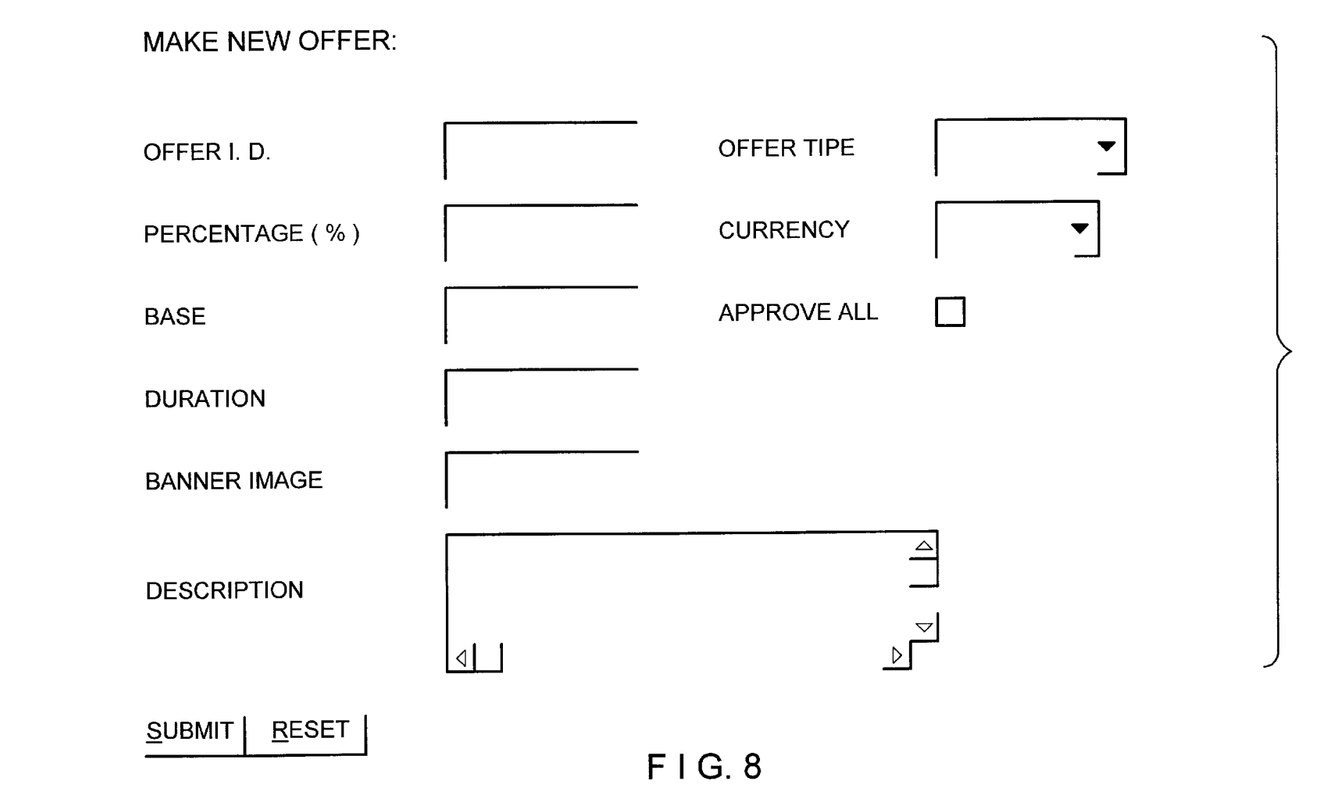
FIG. 8 is a screen display of the data fields on the Clearinghouse server.

Turning now to FIG. 8, a sample display screen is shown, presenting the fields for completion in the offer entry process. As can be readily ascertained, the Merchant uses this field to specify the terms of the offer to Site Owners. After completion, the offer specifics are stored and placed in addressable memory for access by the Site Owners in accordance with FIG. 5 above.

By employing the above-described system, a plurality of ancillary capabilities are available. The database tools permit the generation of detailed transaction reports, which aggregates the data into market related information. These reports have significant intrinsic value and represent a second source of potential revenue for the Clearinghouse.

In particular, the transaction data can be embellished with tax related information, recording sales tax, etc. predicated on the purchase arrangement. Also, to the extent currency exchanges must be used, these can be selected and incorporated in the terms, and subsequently implemented during processing each transaction. Special promotions are possible, including use of affinity reward programs (akin to frequent flyer programs).

Co-branding of products/services is also efficiently accomplished in the foregoing environment. Co-branding is the marketing or sales of two products through a single promotion. The system controlling software on the Clearinghouse server includes a "merge" algorithm that takes two or more images and combines these into an aesthetically acceptable presentation. For example, the resulting banner on the Merchant site will include a "return" button to go back to the originating Site Owner.

As discussed above, the Clearinghouse site includes many different promotion areas and, as such, is subclassified with appropriate headings. Representative headings are presented hereinbelow in Table II.

TABLE II

| Heading | Subcategories |
| --- | --- |
| Automotive | Antiques & Classics |
|  | Buyer Guides |
|  | Classified Ads |
|  | Dealerships |
|  | Parts |
| Computers | Buyers' Guides |
|  | Classified Ads |
|  | Hardware |
|  | Secondhand |
|  | Software |
|  | Superstores |
| Home & Garden | Appliances |
|  | Furniture |

Although the invention has been described in detail for the purpose of illustration, it is to be understood that such detail is solely for that purpose and that variations can be made therein by those skilled in the art without departing from the spirit and scope of the invention.

What is claimed is:

1. In a data processing system for establishing, managing and tracking commercial transactions undertaken on a wide access network, comprising:

a Content Provider site interconnected to said network and programmed to display to a USER visiting said Content Provider through a site content viewing program, information about one or more products or services available for commercial transactions, at a site separate from said Content Provider, wherein said display includes associated with said information, linking instructions for directing said USER's viewing program to a site separate from said Content Provider site, and said linking instructions further comprise code for associating with said visiting USER, a unique USER identification code inserted onto said USER http command line and/or passed along in said USER URL;

a Clearinghouse site interconnected to said network and programmed to receive information regarding display of or selection of said display information on said Content Provider site, and the ability to read said USER unique identification code, and store said code in memory, and further, to provide connection of said USER to an identified Target Merchant Site, wherein said Target Merchant Site is associated to said display information;

a Target Merchant site interconnected to said network and programmed to provide the ability to transact said product and/or services;

wherein said Target Merchant site is further programmed to record information about a purchase made by said USER and to communicate said purchase information back to said Clearinghouse site, wherein said purchase information is used by said Clearinghouse server to allocate credit to the Content Provider.

2. The system of claim 1 wherein the linking instructions placed on said Content Provider site further comprise information about said Content Provider site address.

3. The system of claim 1 wherein said linking instructions code comprises logic to insert said USER identification code onto a http command line via USER prompt, and said display information on said Content Provider site is in the form of highlighted text or graphical image.

4. The system of claim 1 wherein display information on said Content Provider site is in the form of a promotional banner, textual link or icon.

5. The system of claim 1 wherein said network is public access.

6. The system of claim 1 wherein said network is a private intranet.

7. The system of claim 1 wherein said Clearinghouse server further provides data entry relating to promotional arrangements between Merchants and Content Provider.

8. The system of claim 7 wherein said Clearinghouse site includes data storage for retaining a collection of pre-packaged promotional arrangements in the form of offers.

9. The system of claim 8 wherein said promotional arrangements may be configured for auto-approve.

10. The system of claim 1 wherein a cookie and/or means for storing information on said USER'S computer corresponding to the USER'S interaction with the Merchant's site is placed on a USER'S computer if a purchase is not made during a visit to said Merchant's site.

11. The system of claim 10 wherein said cookie and/or means for storing information on said USER'S computer corresponding to the USER'S interaction with the Merchant's site is used to track said visitor during a subsequent visit to said Merchant site.

12. In a central Clearinghouse server for intercommunication with plural remote computers through network connections, comprising:

a first communication link between said central Clearinghouse server and one or more remote Content Providers, wherein said remote Content Providers make available one or more hypertext links in the form of highlighted text, graphics and/or images, and supply said links with coding to associate an identifier with a USER, said coding is inserted onto said USER http command line and/or passed along in said USER URL and to direct said USER to said Clearinghouse server;

a first data processing means for receiving said USER identifier and associating said USER identifier with said originating Content Provider;

a second communication link between said Clearinghouse server and a destination Merchant site, wherein transaction information triggered by a USER during a visit to said Merchant site via said Content Provider hypertext links, is transmitted to said Clearinghouse server;

a second data processing means for processing transaction information from said Merchant site wherein said transaction information includes information regarding actions undertaken by said USER in response to said Content Provider hypertext link.

13. The system of claim 12 wherein said USER identifier is applied to a http command line at said Content Provider upon USER access of a hypertext link associated with a Merchant.

14. The system of claim 12 wherein said second data processing means accumulates transactional data for reporting to said Content Provider.

15. The system of claim 12 wherein said destination Merchant site places a cookie onto a USER for tracking USER visits.

* * * * *